UNITED STATES PATENT OFFICE.

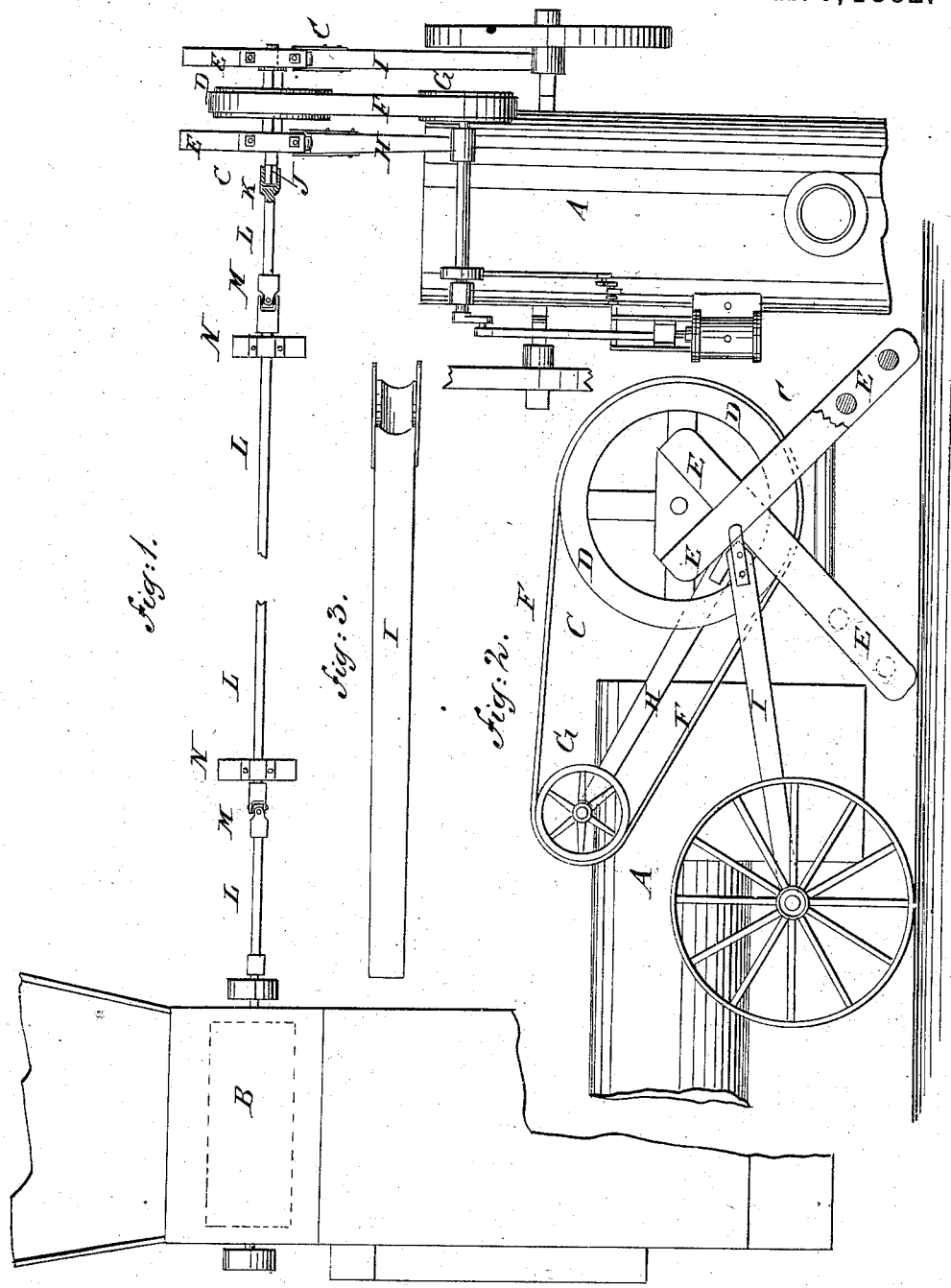

CYRUS STINE, OF McVEYTOWN, PENNSYLVANIA.

MOTOR AND THRASHER CONNECTION.

SPECIFICATION forming part of Letters Patent No. 254,722, dated March 7, 1882.

Application filed June 30, 1881. (No model.)

*To all whom it may concern:*

Be it known that I, CYRUS STINE, of McVeytown, Mifflin county, Pennsylvania, have invented a new and useful Improvement in Motor and Thrasher Connections, of which the following is a specification.

Figure 1 is a plan view of my improvement. Fig. 2 is a side view of the same, and Fig. 3 is a plan view of one of the braces.

Similar letters of reference indicate corresponding parts.

The object of this invention is to promote convenience in connecting motors and thrashers and secure efficiency in said connections.

The invention consists in the combination, with a motor and a thrasher, of a jack, a tumbling-rod, and a belt, whereby the motor can be placed at any desired distance from the thrasher and a short belt used; and, also, in the combination, with the jack and the motor, of a pair of braces, whereby the jack will be held against the pull of the belt, as will be hereinafter fully described.

A represents an ordinary steam-engine, and B represents the ordinary thrasher. C represents a jack, which is formed of a wheel, D, and frame E. The frame E is formed of two X-shaped side frames connected by rounds, and having bearings secured in their upper angles in which revolve the journals of the wheel D. Around the wheel D passes a belt, which also passes around the band-wheel G of the engine A. The jack C is supported against the pull of the belt F by two braces, H I, the ends of which rest in the side angles of the frame E next the engine A. The other end of the brace H rests against the bearings of the band-wheel G, and the other end of the brace I rests against the rear wheel of the engine A, the axle of the said wheel, or some other convenient part of the said engine. The braces H I form all the support that the jack C needs. One, J, of the journals of the wheel D projects, and is squared to fit into the square socket K of the tumbling-rod L, or is connected with the said tumbling-rod by other suitable coupling. The tumbling-rod L is made with one, two, or more universal joints, M, and revolves in bearings N, staked to the ground, or secured to other suitable supports. The other end of the tumbling-rod L is connected with the journal of the thrashing-cylinder, either directly or by suitable gearing, as may be convenient.

With this construction the use of long belts is avoided, and the motor can be placed at any desired distance from the thrasher, or the barn in which the thrasher is placed, without putting any more weight or strain upon the band-wheel of the motor or the cylinder of the thrasher than if the said engine and thrasher were close together. Another advantage of this construction is that the band, being short, can be easily covered and protected from storms, and will not be affected by storms, as a long belt would. With this construction also the motor can be set at one side of a roadway and the thrasher at the other side, when necessary or convenient, and the tumbling-rod led across the road and protected by a bridge of boards, so that the travel along the roadway will not be interrupted by the thrashing or the thrashing be interrupted by the travel.

Having thus described my invention, I claim as new and desire to secure by Letters Patent—

1. The combination, with a motor, A, and a thrasher, B, of a jack, C, a tumbling-rod, L, a belt, F, and the braces H I, substantially as herein shown and described, whereby the engine can be placed at any desired distance from the thrasher and a short belt used, as set forth.

2. In a motor and thrasher connection, the combination, with the motor A and the jack C, formed of X-shaped frames E, of the braces H I, having their outer ends resting in the angles of the said frames and their inner ends against the bearing of the band-wheel and axle respectively of the motor, substantially as and for the purpose set forth.

CYRUS STINE.

Witnesses:
WM. R. BEATTY,
JACOB FRY.